United States Patent
Zansky et al.

(10) Patent No.: US 6,930,869 B1
(45) Date of Patent: Aug. 16, 2005

(54) OR-DIODE INDUCTIVE LOAD SPIKE SUPPRESSOR

(75) Inventors: Zoltan Zansky, San Carlos, CA (US); Bill Jacobsen, Sunnyvale, CA (US)

(73) Assignee: Network Appliance Inc., Sunnyvale, CA (US)

(*) Notice: Subject to any disclaimer, the term of this patent is extended or adjusted under 35 U.S.C. 154(b) by 0 days.

(21) Appl. No.: 10/408,855

(22) Filed: Apr. 8, 2003

(51) Int. Cl.[7] ................................ H02H 3/18
(52) U.S. Cl. ..................................... 361/84
(58) Field of Search ................ 361/91.5, 84, 58, 361/66, 91.1

(56) References Cited

U.S. PATENT DOCUMENTS

| | | | | |
|---|---|---|---|---|
| 4,476,415 A | * | 10/1984 | Kautz et al. | 318/135 |
| 5,654,859 A | * | 8/1997 | Shi | 361/66 |
| 6,078,156 A | * | 6/2000 | Spurr | 318/368 |
| 6,462,926 B1 | * | 10/2002 | Zaretsky et al. | 361/103 |
| 6,545,514 B2 | * | 4/2003 | Barrow | 327/110 |
| 6,611,410 B1 | * | 8/2003 | Makaran | 361/84 |

* cited by examiner

Primary Examiner—Brian Sircus
Assistant Examiner—Zeev Kitov
(74) Attorney, Agent, or Firm—Suiter West Swantz PC LLO

(57) ABSTRACT

The present invention is a method and system for preventing voltage spike feedback with switched inductive loads connected to isolated redundant power supplies. A voltage clamp circuit of the present invention may clamp the voltage spikes caused by inductive loads within a power supply system to a safe voltage level. When the common output voltage of the redundant power supplies becomes too large, the voltage clamp circuit of the present invention may clamp the common output voltage to a safe voltage level at or slightly above the higher voltage of the parallel connected power supplies.

12 Claims, 6 Drawing Sheets

OR-DIODE INDUCTIVE LOAD SPIKE SUPPRESSOR

FIELD OF THE INVENTION

The present invention generally relates to the field of power supplies, and more particularly to a method and system for preventing voltage spike feedback of switched inductive loads connected to isolated redundant power supplies.

BACKGROUND OF THE INVENTION

Conventional power supply designs intended for redundant applications typically include OR-diodes. An OR-diode is typically utilized in redundant power supply systems at the outputs of parallel connected power supplies to provide higher output power and prevent a dead power supply or a power supply with a low output voltage from drawing current from a power supply with a higher output voltage or vice versa. An OR-diode may refer to a plurality of diodes in which, for a positive output power supply, the cathodes of each diode are connected to a common output of a plurality of redundant power supplies and anodes of each diode are coupled to the individual outputs of the individual power supplies. For a negative output power supply, the anodes of each diode are connected to a common output of a plurality of redundant power supplies and cathodes of each diode are coupled to the individual outputs of the individual power supplies.

A problem associated with the use of OR-diodes arises when inductive loads, such as computer data storage disk drives and fans, are powered by the redundant power supplies. Inductive loads introduce positive voltage spikes on their DC input which reverse polarize the OR-diodes. The output capacitors, connected after the OR-diodes of the redundant power supplies, are typically too small to provide suppression of voltage spikes over the specified maximum voltage of the power supplies caused by inductive loads. As a result, the voltage spikes may cause damage to the electronic control circuits of the inductive loads. Consequently, a method and system for preventing voltage spike feedback of switched inductive loads connected to isolated redundant power supplies is necessary.

SUMMARY OF THE INVENTION

Accordingly, the present invention is directed to a method and system for preventing voltage spike feedback of switched inductive loads connected to isolated redundant power supplies. In an embodiment of the present invention, a voltage clamp circuit of the present invention may clamp the voltage spikes caused by inductive loads to a safe voltage threshold level. The threshold voltage level may be within or slightly above the specified regulation window of the power supplies, for example with a typical regulation window for power supplies at ±5%, the threshold voltage level may be within ±10% of the desired output voltage. When the output voltage of the redundant power supplies becomes too large, the voltage clamp circuit of the present invention may clamp the voltage spike level to the threshold voltage level at or above the higher voltage of the parallel connected power supplies.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
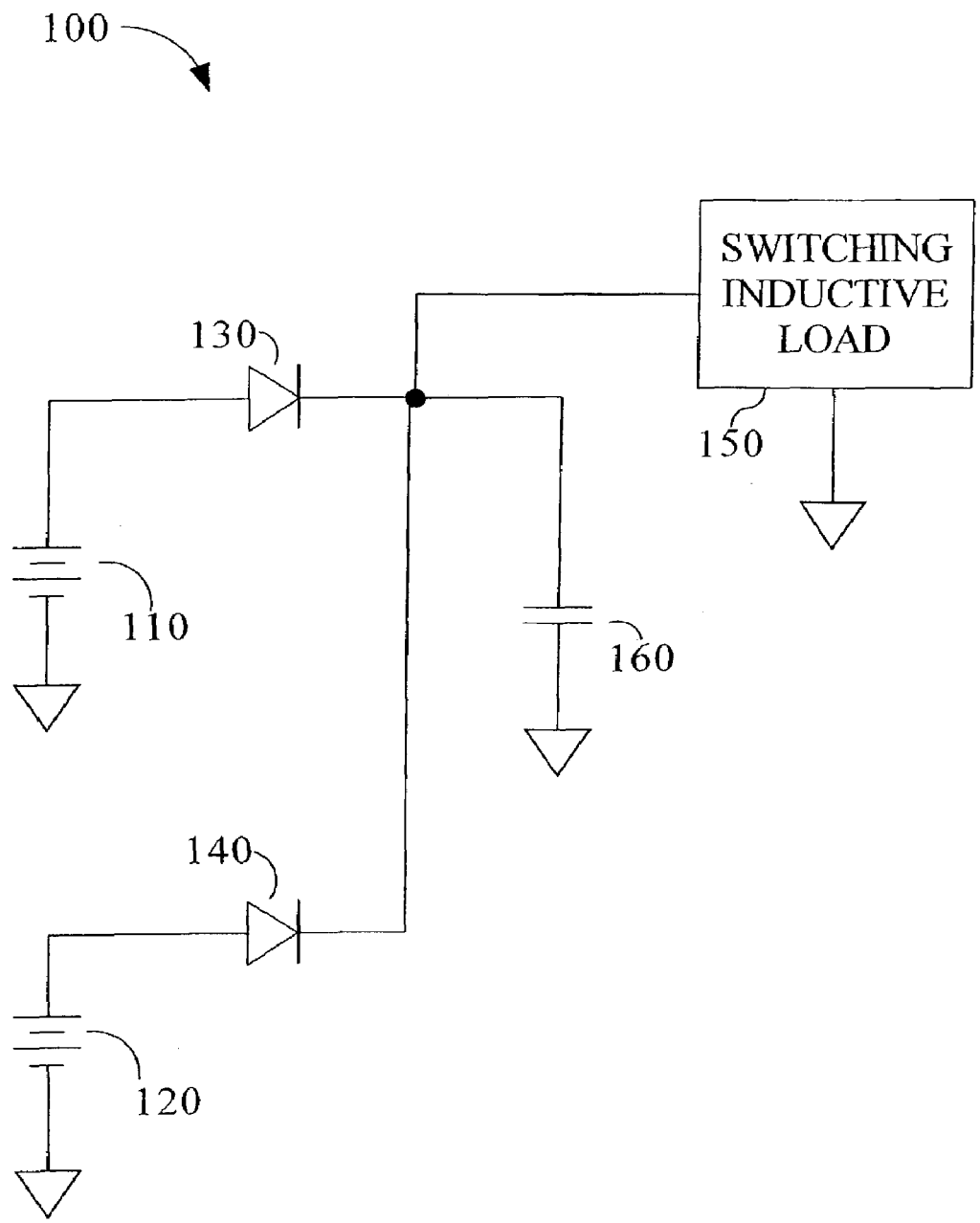
FIG. 1 depicts a block diagram of a power supply system known to the art.

Referring to FIG. 1, a block diagram of a power supply system 100 known to the art is shown. Power supply system 100 may include redundant power supplies 110–120. Diodes 130–140 may form an OR-diode to provide higher output power and prevent a power supply with a low output voltage from drawing current from a power supply with a higher output voltage or vice versa. A switching inductive load 150 is powered by the redundant power supplies 110–120. Switching inductive load 150 typically introduce positive voltage spikes on the common output of power supplies 110–120 which reverse polarize the diodes 130–140. The output capacitance 160 of the redundant power supplies connected after the OR-diodes is typically too small thus is incapable of attenuating the voltage spikes caused by the inductive loads. Voltage spikes may damage the OR-diodes, the filter capacitance 160, electronic control circuits of the switching inductive load 150, and other electronic control circuits fed from the same voltage bus.

Figure 2:
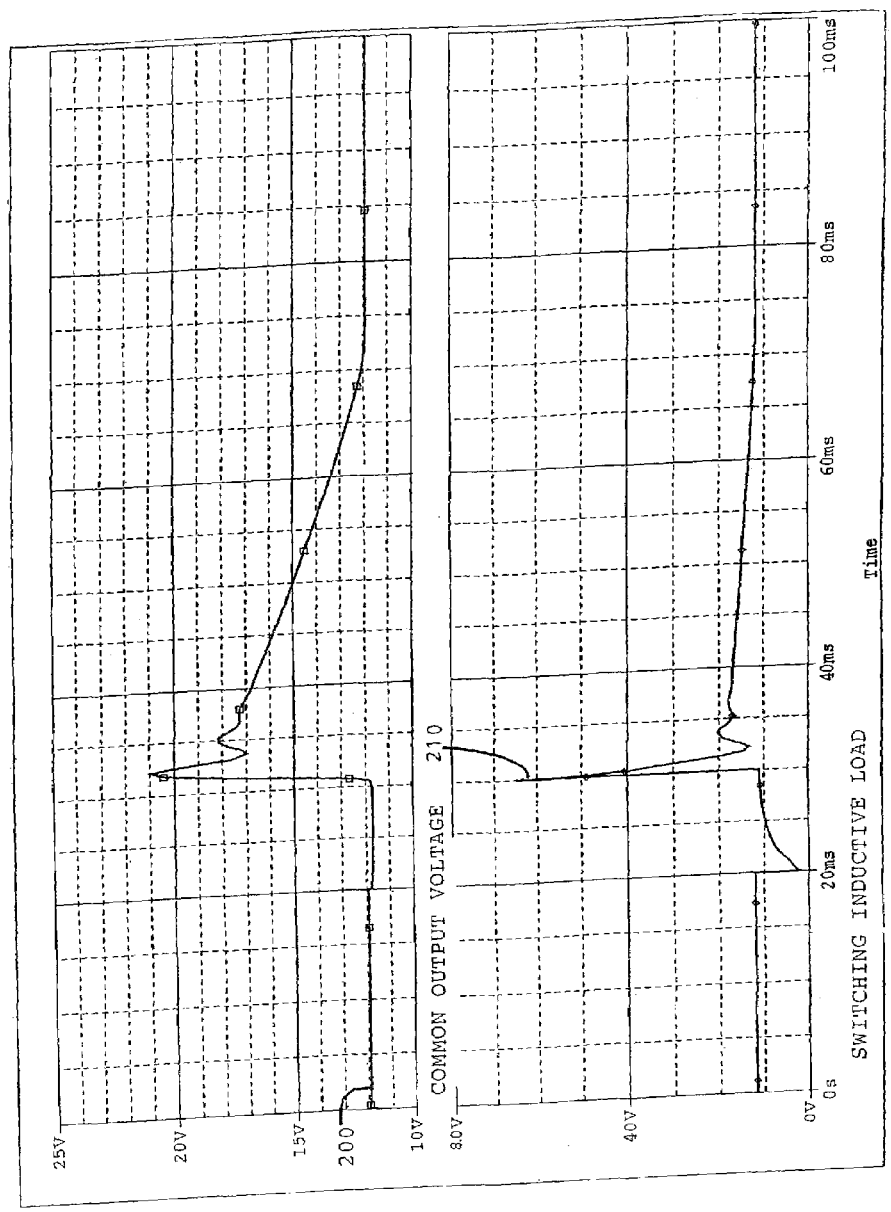
FIG. 2 depicts an embodiment of a common output voltage waveform when a voltage spike occurs in a redundant power supply system employing OR-diodes known to the art.

Referring to FIG. 2, an embodiment of a common output voltage waveform 200 when a voltage spike occurs in a redundant power supply system employing OR-diodes known to the art is shown. The voltage waveforms are representative of operation of a power supply system 100 of FIG. 1 known to the art. Typical output of the power supplies is approximately 12 volts. Power supplies may be rated at ±5%, consequently, the output should remain approximately between 11.4 and 12.6 volts. When a voltage spike 210 is introduced to the power supply system 100 by the switching inductive load 150 of FIG. 1, the common output voltage 200 of the power supplies after the OR-diodes rises to over 20 volts since the OR-diodes are reverse-biased and are incapable of clamping the voltage. This amount of voltage may cause damage to the OR-diodes, the filter capacitance 160, and the electronic control circuits of the switching inductive load 150.

Figure 3:
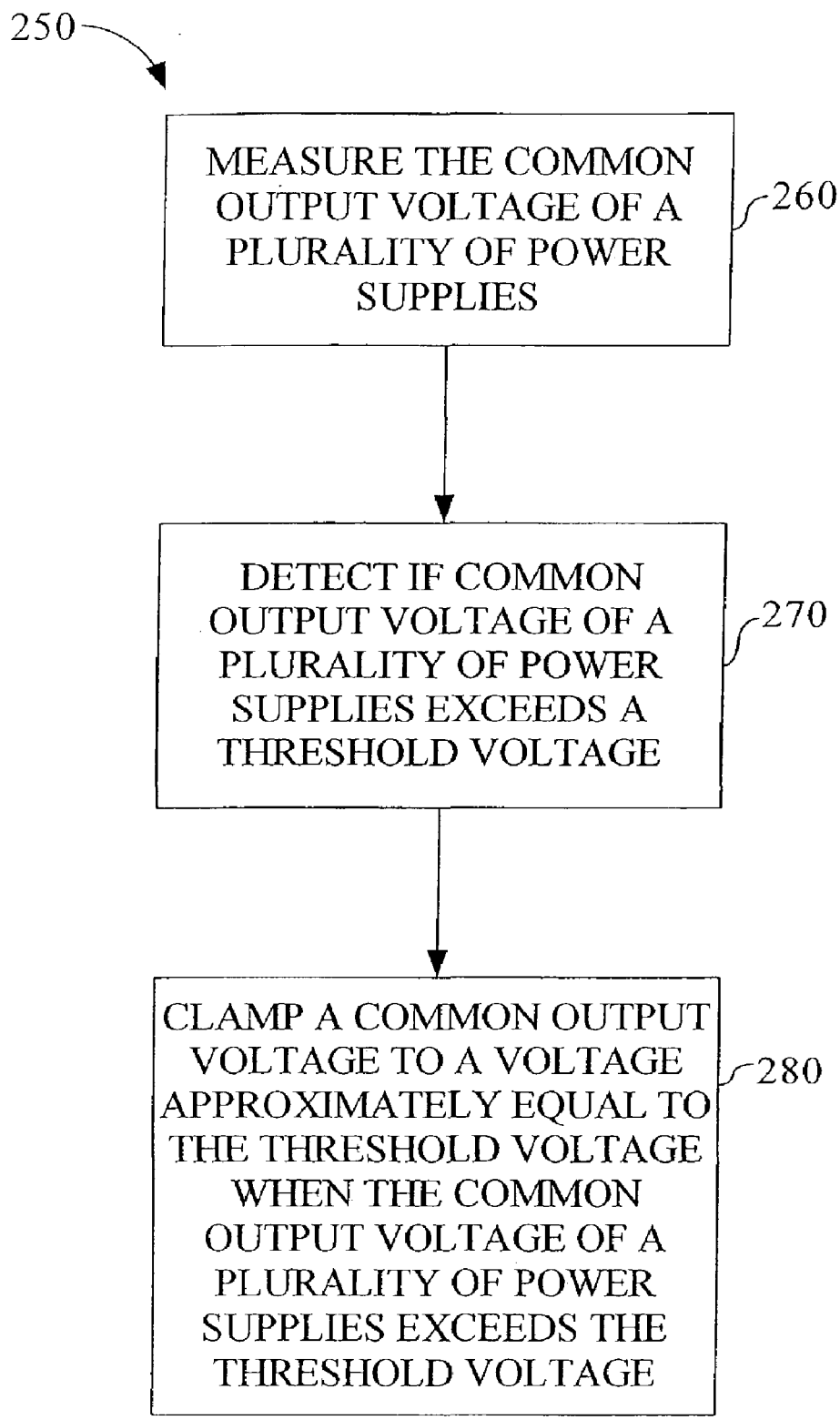
FIG. 3 depicts a flow diagram of a process for preventing voltage spike feedback in a power supply system in accordance with an embodiment of the present invention.
Figure 4:
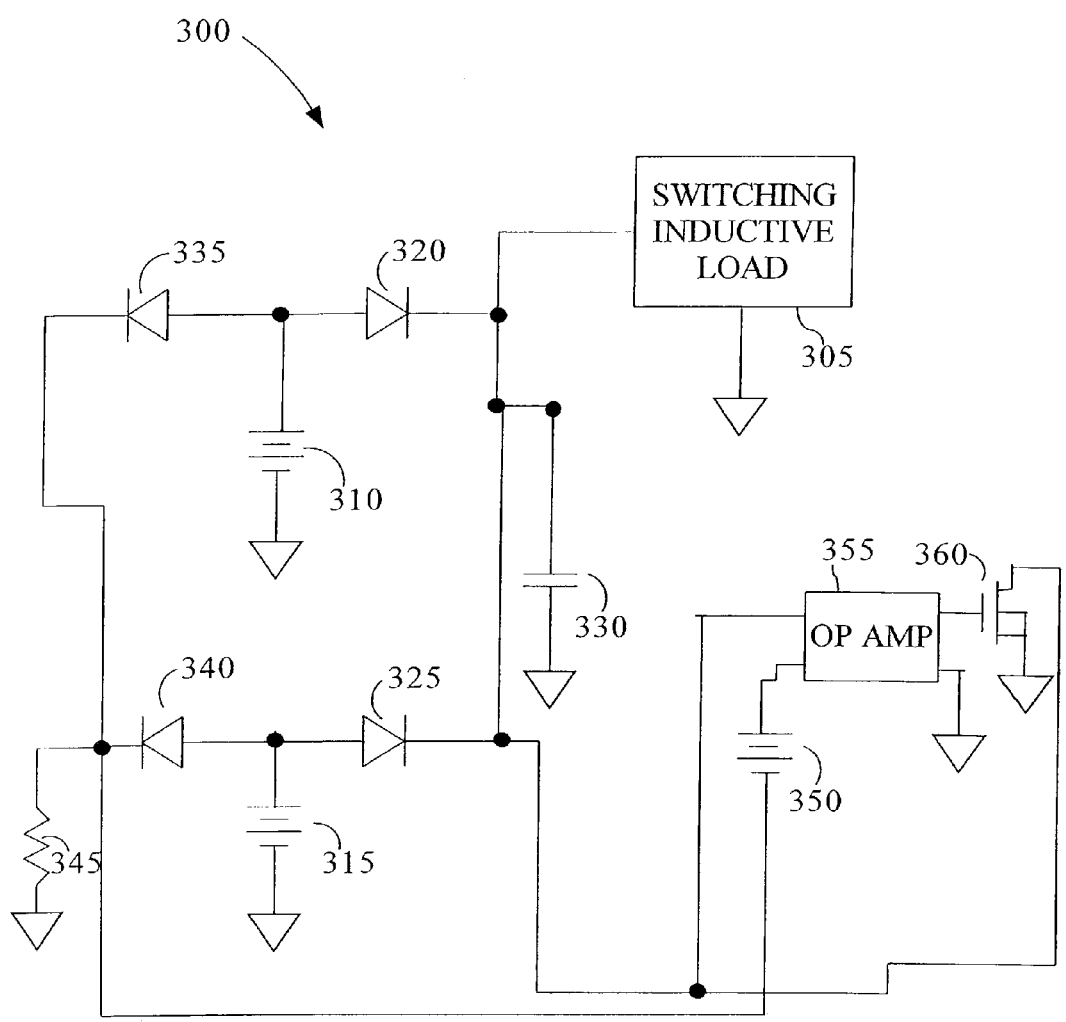
FIG. 4 depicts a block diagram of a power supply system according to an embodiment of the present invention.
Figure 5:
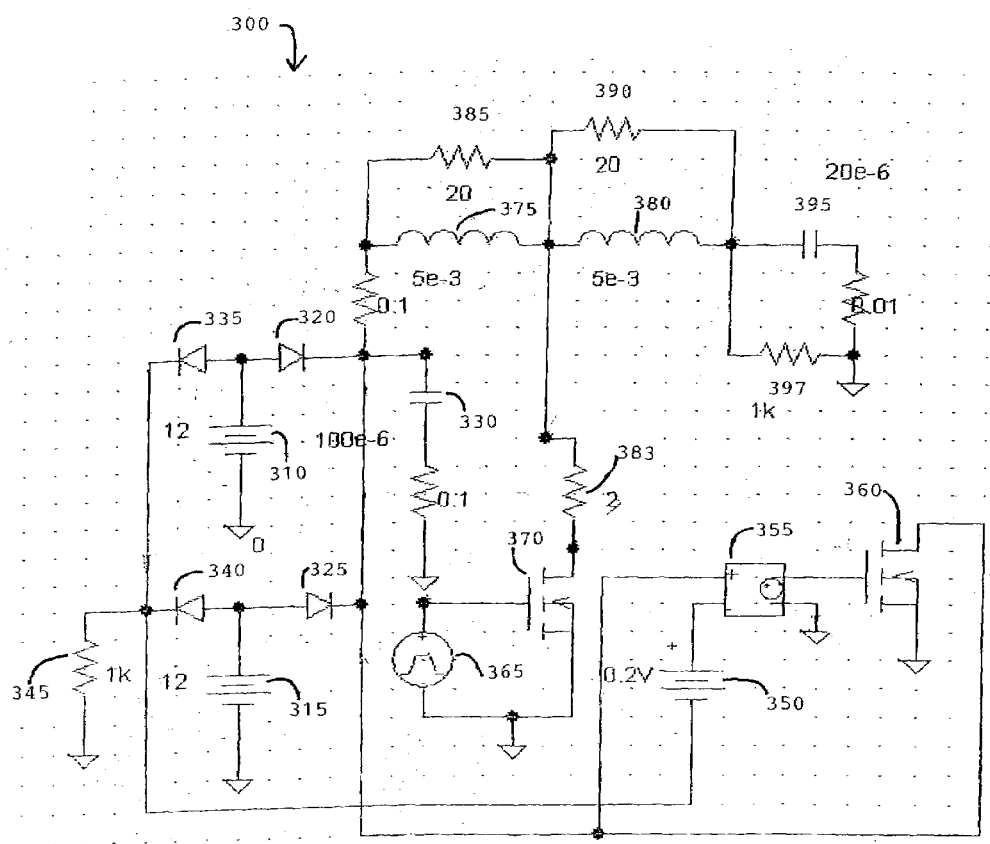
FIG. 5 depicts a detailed diagram of the power supply system of FIG. 3 in accordance with an embodiment of the present invention.

Referring generally to FIGS. 3–5, a methods and systems of preventing voltage spike feedback of switched inductive loads connected to isolated redundant power supplies are shown. In an advantageous aspect of the present invention, an output voltage may be clamped to a desired voltage when the highest of the power supply output voltages exceeds a threshold voltage. This may prevent damage to OR-diodes and electronic control circuits of switched inductive loads being powered by redundant power supply systems as shown in FIG. 1.

Referring specifically to FIG. 3, a flow diagram of a process 250 for preventing voltage spike feedback in a power supply system in accordance with an embodiment of the present invention is shown. Process 250 may be executed by system 300 of FIG. 4 and FIG. 5 to prevent voltage spike feedback.

Process 250 may begin by measuring the common output voltage of a plurality of power supplies 260. Redundant power supply systems typically include a plurality of power supplies coupled to a common output through an OR-diode, the OR-diode providing isolation for each power supply. Each power supply may provide an output voltage. The common output voltage of the plurality of output voltages may be measured.

Process 250 may include detection of the common output voltage of the plurality of power supplies exceeds a threshold voltage 270. In an embodiment of the invention, a threshold voltage may be set at a voltage level that is safe for devices and components within the power supply system at or just above the top of the specified voltage regulation window of the power supplies after the OR-diodes. For example, a 12 volt power supply may be rated at 5%. Thus, the output voltage of each power supply, including its incorporated voltage regulation, may maintain the output voltage of the power supply between 11.4 and 12.6 volts. The threshold voltage may be set at a level at or slightly above the specified voltage regulation window of the power supplies. Additionally, the threshold voltage may be adjusted according to the desired application in which the power supply system is utilized.

When the common output voltage of the redundant power supplies exceeds a threshold voltage level, the common output voltage of the redundant power supplies may be clamped to a voltage approximately equal to the threshold voltage 280. As an example, if a switching inductive load coupled to a redundant power supply introduces a voltage spike causing the common output voltage of the power supplies to rise above a threshold voltage level, then the common output voltage of the redundant power supply system may be clamped to a voltage level approximately equal to the threshold voltage level. This may prevent damage to the redundant power supply system and the electronic control circuits of the switching inductive load due to a high voltage spike introduced by the switching inductive load.

Referring to FIG. 4, a block diagram of a power supply system 300 according to an embodiment of the present invention is shown. Power supply system 300 may prevent voltage spike feedback within the power supply system 300 when coupled with a switched inductive load 305. Switched inductive load 305 may, in an embodiment of the invention, be computer data storage disk drives and one or more fans. It should be understood by those with ordinary skill in the art that various types of switching inductive loads may be utilized in accordance with the present invention without departing from the scope and intent of the present invention. Power supply system 300 may be similar to power supply system 100 known to the art, however, power supply system 300 may include voltage clamp circuitry of the present invention. Power supply system 300 may include redundant power supplies 310–315, diodes 320–325 that may form an OR-diode, and an output capacitance 330.

Additional circuitry of the present invention may include diodes 335–340. The anode of each diode 335–340 may be coupled to the output of a power supply 310–315 respectively. The cathodes of the diodes 335–340 and resistor 345 are coupled to a reference voltage 350. Reference voltage may be selected to create a desirable threshold voltage as discussed with respect to FIG. 3. An operational amplifier 355 may have its positive input connected to the common output of the isolated redundant power supplies 310–315 and its negative input coupled to the reference voltage 350. The output of the operational amplifier 355 is fed to a transistor 360. The gain of the amplifier may be chosen as desirable, however, in an embodiment of the invention the gain is selected as greater than twenty.

Turning to the operation of the power supply system 300 of FIG. 4, clamping circuitry of the power supply system 300 may perform the steps of the process for preventing voltage spike feedback in a power supply system of FIG. 3. A threshold voltage may be derived from the higher of each voltage output of the power supplies 310–315 through diodes 335–340 and reference voltage 350. When the voltage on the positive input of the operational amplifier 355 exceeds the voltage on the negative input of the operational amplifier 355, then the operational amplifier 355 may switch the transistor 360 on. When the transistor 360 turns on, it clamps the voltage spike on the common connected cathodes of the diode 320 and diode 325 output OR-diode of the power supplies 310–315. The resulting clamped voltage may be a voltage of approximately the highest voltage of power supplies 310–315 plus the voltage of the reference voltage 350. In an embodiment of the invention, reference voltage 350 may be 0.2 volts, however, it should be understood by those with ordinary skill in the art that the reference voltage may be determined according to the desired application and desired response of the clamping circuitry.

An advantageous aspect of the clamping circuitry of the present invention is the small dynamic resistance of the circuitry. Zener diodes and "tranzorb" transient suppressing elements are unable to attenuate voltage spikes caused by switching inductive loads due to their inherently high dynamic resistance. While FIG. 4 depicts an embodiment of clamping circuitry to implement process 250 of FIG. 3, it should be understood that other components and devices may be incorporated within the power supply system 300 of FIG. 4 to implement process 250 of the present invention without departing from the scope and intent of the present invention.

Referring to FIG. 5, a detailed diagram of the power supply system 300 of FIG. 4 in accordance with an embodiment of the present invention is shown. FIG. 5 depicts an exemplary embodiment of a switching inductive load 305 of FIG. 4. Switching inductive load 305 may include a pulse width modulated voltage source 365 coupled to a transistor 370. Transistor 370 may direct current flow among inductances 375–380, which may reflect windings of fan motors or hard disk drive motors. Resistors 383, 385, 390 and 397 along with capacitor 395 also influence current flow among the switching inductive load. It should be understood that FIG. 5 may depict a representative switching inductive load, however, other depictions may also be contemplated by those of ordinary skill in the art which would not depart from the scope and intent of the present invention.

Figure 6:
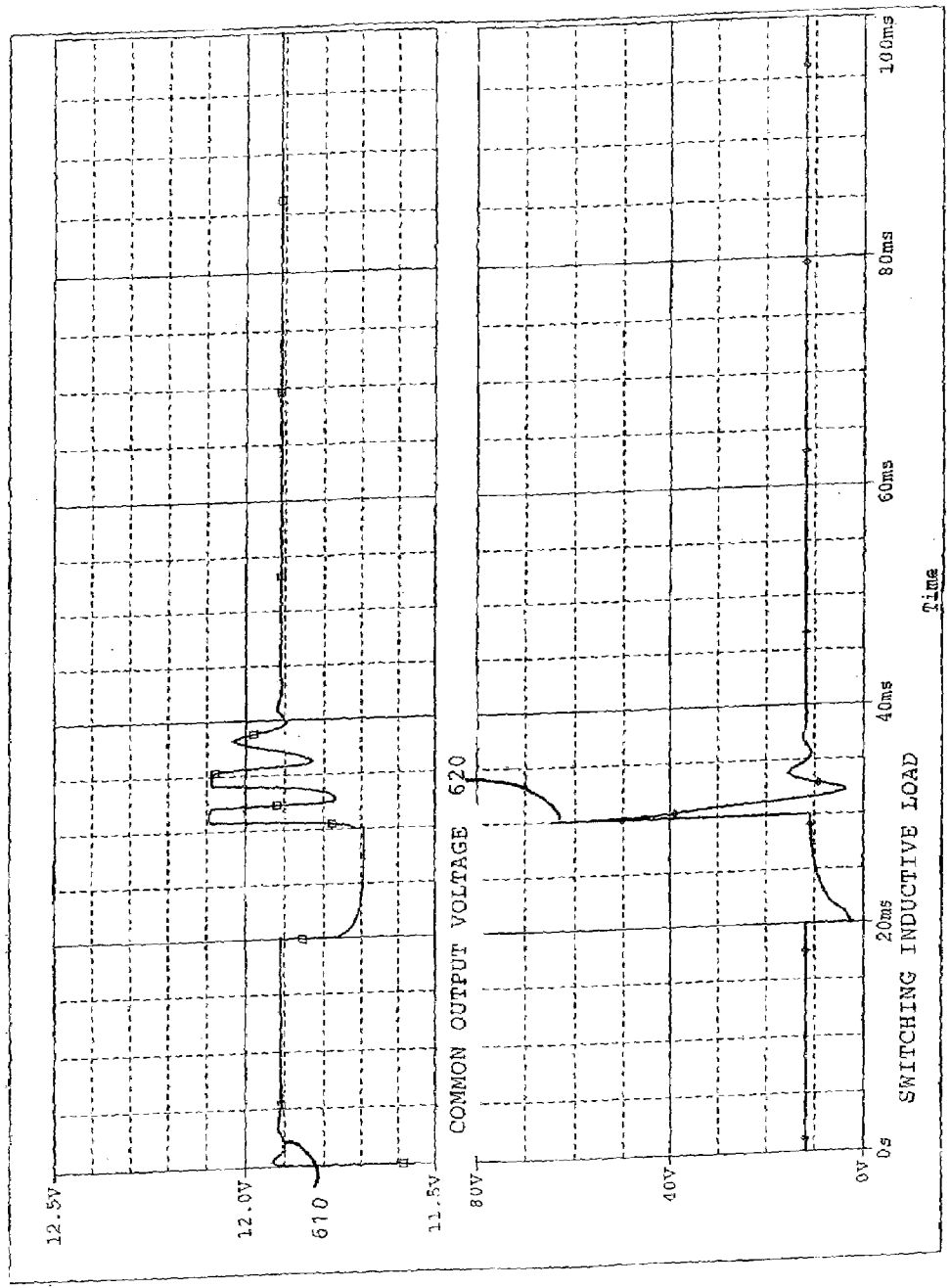
FIG. 6 depicts an embodiment of a common output voltage waveform when a voltage spike occurs in a redundant power supply system including OR-diodes and voltage clamp circuitry of the present invention.

Referring now to FIG. 6, an embodiment of a common output voltage waveform 610 when a voltage spike occurs in a redundant power supply system including OR-diodes and voltage clamp circuitry of the present invention is shown. The voltage waveforms are representative of operation of a power supply system 300 of FIGS. 4 and 5. The common output voltage waveform 610 of a plurality of power supplies is approximately 11.9 volts until time is 20 milliseconds. At 30 milliseconds, a voltage spike 620 is introduced by the switching inductive load of the power supply system. However, with the voltage clamp circuitry of FIGS. 4–5 of the present invention, the common output voltage of the power supplies rises only to 12.1 volts. The clamped common output voltage of 12.1 volts is a result of the 11.9 volt output voltage and a 0.2 volt reference voltage. This is advantageous as the spike does not result in a high common output voltage which may cause damage to the electronic control circuits of the switching inductive load and the power supplies.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for preventing voltage spike feedback, comprising:
    at least two isolated power supplies;
    a switching inductive load coupled to a common output of said at least two isolated power supplies;
    an operational amplifier having a first and second inputs, said first input being coupled to said common output of said at least two isolated power supplies,
    a reference voltage supply, said reference voltage supply being coupled to said second input of said operational amplifier, said reference voltage supply creating a threshold voltage in combination with a higher voltage of said at least two power supplies, wherein upon said inductive load creating a voltage spike on said common output of said at least two isolated power supplies, said operational amplifier detects whether a common output voltage of said at least two isolated power supplies exceeds said threshold voltage and said operational amplifier clamps said common output voltage to a voltage approximately equal to said threshold voltage.

2. The system as claimed in claim 1, further comprising a transistor coupled to an output of said operational amplifier.

3. The system as claimed in claim 2, said transistor being turned on by said output of said operational amplifier when said common output voltage exceeds said threshold voltage.

4. The system as claimed in claim 3, wherein said transistor is turned on, said common output voltage is pulled down to said voltage approximately equal to said threshold voltage.

5. The system as claimed in claim 1, wherein said switching inductive load is a computer data storage disk drive.

6. The system as claimed in claim 1, wherein said switching inductive load is at least one fan motor.

7. The system as claimed in claim 1, wherein said common output of said at least two isolated power supplies employs an OR-diode.

8. A system for preventing voltage spike feedback, comprising:
    at least two power supplies;
    an inductive load coupled to a common output of said at least two power supplies;
    means for measuring a common output voltage of said at least two power supplies;
    means for detecting if said common output voltage of said at least two power supplies exceeds a threshold voltage; and
    means for clamping said common output voltage of said at least two power supplies to a voltage approximately equal to said threshold voltage when said common output voltage of said at least two power supplies exceeds said threshold voltage, wherein said threshold voltage is derived from a reference voltage and a highest voltage of said at least two power supplies.

9. The system as claimed in claim 8, wherein said clamping means pulls the common output voltage of said at least two power supplies down to said voltage approximately equal to said threshold voltage.

10. The system as claimed in claim 8, wherein said inductive load is a switching inductive load.

11. The system as claimed in claim 10, wherein said switching inductive load is a computer data storage disk drive.

12. The system as claimed in claim 10, wherein said switching inductive load is at least one fan motor.

* * * * *